April 20, 1926.  
E. KUMMER  
TRACTOR HITCH  
Filed Feb. 23, 1924  
1,581,272

Inventor,  
Edward Kummer  
By Frank S. Appleman  
Attorney

Patented Apr. 20, 1926.

1,581,272

UNITED STATES PATENT OFFICE.

EDWARD KUMMER, OF JUNCTION CITY, KANSAS.

TRACTOR HITCH.

Application filed February 23, 1924. Serial No. 694,733.

*To all whom it may concern:*

Be it known that I, EDWARD KUMMER, a citizen of the United States of America, and resident of Junction City, in the county of Geary and State of Kansas, have invented certain new and useful Improvements in Tractor Hitches, of which the following is a specification.

This invention relates to hitches for trailers, and has reference more particularly to a hitch for connecting a plow to a tractor.

It is an object of this invention to produce a device interposed between the tractor and the load, whereby allowance is made for a certain amount of lateral movement of the tractor or the load with relation to each other; the said device also having a yieldable connection between the drawbar and that portion of the device that is connected to the plow.

It is a further object of this invention to produce a hitch of the character indicated which will facilitate turning of the tractor and plow to minimize the space required for the operation of the said tractor and plow when they are connected together.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1:
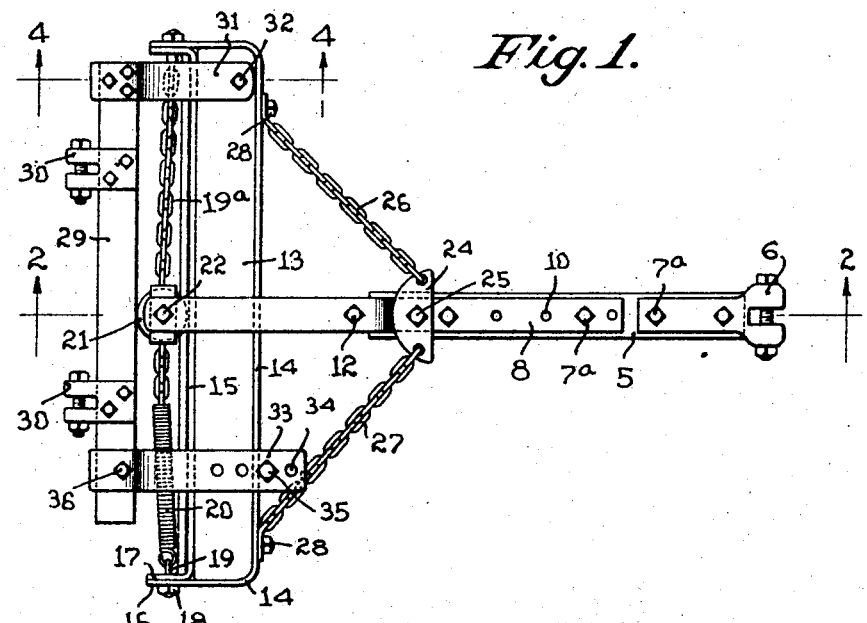
Figure 1 illustrates a plan view of a hitch embodying the invention.
Figure 2:
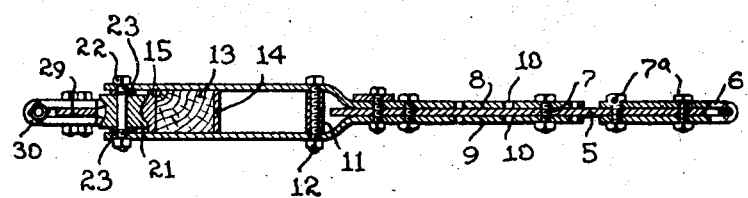
Figure 2 illustrates a sectional view on the line 2—2 of Fig. 1.
Figure 3:
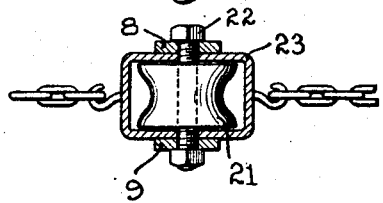
Figure 3 illustrates an enlarged detail view of a roller and parts associated with it.
Figure 4:
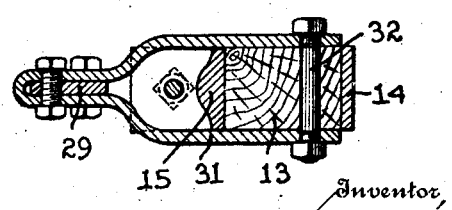
Figure 4 illustrates a sectional view on the line 4—4 of Fig. 1.

In these drawings, 5 denotes a drawbar having a suitable coupling device by which it may be attached to a tractor, as at 6, the said drawbar, in the present embodiment of the invention, being provided with apertures 7 to receive bolts $7^a$ in order that the drawbar may be adjusted to increase or diminish the distance between the tractor and the load. The drawbar is maintained between two strips of metal 8 and 9 that have a plurality of coinciding apertures 10 in order that the same may be brought into alinement with the apertures of the drawbar for changing the position of the drawbar with relation to the said strips. The strips are separated at their rear ends and are held in spaced relation to each other by a sleeve 11 and a bolt 12 in order that the said strips may straddle a beam 13 and move longitudinally of the beam, as will presently appear.

The beam is embraced at its edges by facing strips 14 and 15 having angularly disposed ends 16 and 17 respectively, and these ends 16 and 17 lie parallel with each other and are connected together by an eye bolt 18. The construction is identical at the two ends of the beam and the eye bolts are intended as anchorages for a chain $19^a$ and a spring 20 at their respective ends of the beam. The facing strip 15 has a convex surface and it acts as a track or bearing on which a grooved wheel 21 may ride or travel. The wheel is interposed between the diverging ends of the strip and is rotatably mounted on a spindle or shaft 22.

A yoke 23 is oscillatable on the member 22 between the diverging ends of the strips, and one end of the spring 20 is connected to the said yoke and an end of the chain $19^a$ is connected to the yoke on the opposite side of the member 22.

A plate 24 is mounted on a bolt or the like 25 in the drawbar, and the said plate is apertured to receive the ends of chains 26 and 27 that have their opposite ends connected to the beam in suitable manner, as by apertured plates and the bolts 28.

A coupling bar 29 has suitable means such as 30 by which it is attached to a plow or trailer, and this bar 29 is pivotally connected at one end to the beam 13 by means of the elements 31, which are in the nature of metal plates or strips, that are anchored to the bar 29 and mounted on a pivot 32 extending through the beam. Thus the elements 31 may oscillate on the pivot 32 to compensate for certain movement of the tractor and plow independently of each other. At the opposite end of the bar 29 there is a connecting plate 33 that has apertures 34 to receive a bolt 35. The plate 33 is connected to the beam by a fastening 36 such as a bolt, and through the employment of the bolt 35 in any one of the apertures 34, the bar 29 may be adjusted with relation to the beam, as will be apparent from an inspection of the drawing.

The construction of the drawbar may, of course be changed as to the elements comprising it, since the invention relates more particularly to the mechanism by which movement is afforded the drawbar with respect to the beam, and the mechanism by which the coupling bar has movement independently of the beam and the drawbar.

While reference has been made to the connections being at the ends of the beam or in certain fixed relation to the beam, it is understood that if the connection is made substantially at the end of the beam, it will answer the purpose of the invention.

It is the purpose of the inventor that the elements 26 and 27 that are connected to the drawbar between its ends and to the beams near their ends may comprise chains or link connections, but they are removably applied to the device in order that they may be detached and omitted while the plowing operation is being conducted. These elements are of utility in moving the tractor hitch upon the row or from one location to another.

It will also be understood that in operation the chain 19ª is adjustable at the beam and is intended to control the amount of land cut or the width of the swaths of the plows. The spring 20 is employed as an equalizer when the tractor is making a turn during the plowing operation, as at the ends of the field being plowed or on the corners where turns are made. The spring is also of utility, should the plows encounter obstructions such as stumps or rocks and also when turns are made, as the spring is of such strength that it acts to restore the beam to its normal position to the width of the swath fixed by the chain 19ª. For example, if eight plows are being used and four of the plows on the right hand side encounter a stone, root or other obstruction so that the course of the plows is momentarily deflected from the course in which it is desired that they should go, when the obstruction is passed or removed, the spring always brings the plows back to their course and makes the swath or widths of the furrows practically uniform.

I claim:

1. In a tractor hitch, a transverse beam, a drawbar, a resilient connection between the inner end of the drawbar and one end of the beam, a non-stretchable connection between the inner end of the drawbar and the opposite end of the beam, and a hitch pivotally connected to the beam at one end and adjustable at the other end, and means adapted to connect the beam to the load.

2. In a tractor hitch, a beam, a drawbar, detachable connections from the drawbar between its ends to substantially the ends of the beam, a resilient connection between the inner end of the drawbar and one end of the beam, a non-stretchable connection between the inner end of the drawbar and the opposite end of the beam, and a hitch for connecting the drawbar to the load.

3. In a tractor hitch, a beam, a drawbar, detachable connections from the drawbar between its ends to substantially the ends of the beam, a resilient connection between the inner end of the drawbar and one end of the beam, a non-stretchable connection between the inner end of the drawbar and the opposite end of the beam, and a hitch pivotally connected to the drawbar and adapted to be connected to the load.

4. In a tractor hitch, a transverse beam, a drawbar which extends forwardly therefrom, a resilient connection between the drawbar and one end of the beam, a non-stretchable connection between the end of the drawbar and the opposite end of the beam, and a bar pivotally connected at one end to the beam and adjustably connected thereto at its opposite end.

5. In a tractor hitch, a transverse beam having attached thereto a guide rail, a drawbar having a roller for engagement with the guide rail, a resilient connection between one end of the drawbar and one end of the beam, a non-stretchable connection between the end of the drawbar and the opposite end of the beam, and adjustable means associated with the beam and maintained rearward thereof, said beam having means for connecting it to a plow.

6. In a tractor hitch, a beam, a drawbar, a resilient connection between one end of the drawbar and one end of the beam, a non-stretchable connection between the end of the drawbar and the opposite end of the beam, a coupling bar to which a plow may be connected, and means oscillatably mounted on the beam for connecting the coupling bar to the beam.

EDWARD KUMMER.